United States Patent
Heinig

Patent Number: 6,046,521
Date of Patent: *Apr. 4, 2000

[54] ELECTRIC SUBMERGIBLE MOTOR PROTECTOR HAVING COLLAPSE RESISTANT RIBBED ELASTOMERIC BAG

[75] Inventor: Edine M. Heinig, Lawrence, Kans.

[73] Assignee: Camco International, Inc., Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/008,897

[22] Filed: Jan. 20, 1998

[51] Int. Cl.⁷ ..................... E21B 47/01
[52] U.S. Cl. ............ 310/87; 428/35.7; 428/36.92
[58] Field of Search ............... 383/105, 116, 383/119; 310/87; 428/36.8, 36.92, 36.3, 35.7

[56] References Cited

U.S. PATENT DOCUMENTS

| | | | |
|---|---|---|---|
| 768,944 | 8/1904 | Kepler | 428/36.8 |
| 2,569,741 | 10/1951 | Arutunoff | 310/87 |
| 2,674,194 | 4/1954 | Arutunoff | 310/87 |
| 2,674,702 | 4/1954 | Arutunoff | 310/87 |
| 2,785,720 | 3/1957 | Wikle | 383/119 |
| 2,854,595 | 9/1958 | Arutunoff | 310/87 |
| 3,356,120 | 12/1967 | Nohmura | 383/119 |
| 3,883,046 | 5/1975 | Thompson et al. | 383/3 |
| 3,947,709 | 3/1976 | Waltman | 310/87 |
| 4,076,121 | 2/1978 | Clayton et al. | 428/167 |
| 4,349,204 | 9/1982 | Malone | 277/34 |
| 4,421,999 | 12/1983 | Beavers et al. | 310/87 |
| 4,585,400 | 4/1986 | Miller | 383/119 |
| 4,597,425 | 7/1986 | Tally | 383/904 |
| 4,890,757 | 1/1990 | Robbins, III | 220/72 |
| 4,940,911 | 7/1990 | Wilson | 310/87 |
| 4,964,540 | 10/1990 | Katz | 383/3 |
| 4,979,628 | 12/1990 | Robbins, III | 215/1 |
| 5,205,650 | 4/1993 | Rasmussen | 383/107 |
| 5,353,043 | 10/1994 | Takagaki | 383/104 |
| 5,367,214 | 11/1994 | Turner, Jr. | 310/87 |
| 5,501,757 | 3/1996 | Takagaki | 156/196 |

FOREIGN PATENT DOCUMENTS

| | | | |
|---|---|---|---|
| 0 695 853 A2 | 2/1996 | European Pat. Off. | E21B 47/06 |
| 0 844 366 A1 | 5/1998 | European Pat. Off. | E21B 47/01 |
| 71-041813B | 10/1971 | Japan | 383/116 |
| 01-152940 | 6/1989 | Japan | 310/87 |
| 1002944 | 9/1965 | United Kingdom | 310/87 |

*Primary Examiner*—Ellis Robinson
*Assistant Examiner*—John Figueroa
*Attorney, Agent, or Firm*—Fletcher, Yoder & Van Someren

[57] ABSTRACT

A reinforced elastomeric bag for use within an electric submergible motor protector has a generally cylindrical bag body formed as a single continuous structure, and a plurality of reinforcing ribs longitudinally disposed about an inside surface of the bag body. The reinforcing ribs prevent the bag body from collapsing onto and blocking oil inlet ports within the motor protector.

20 Claims, 3 Drawing Sheets

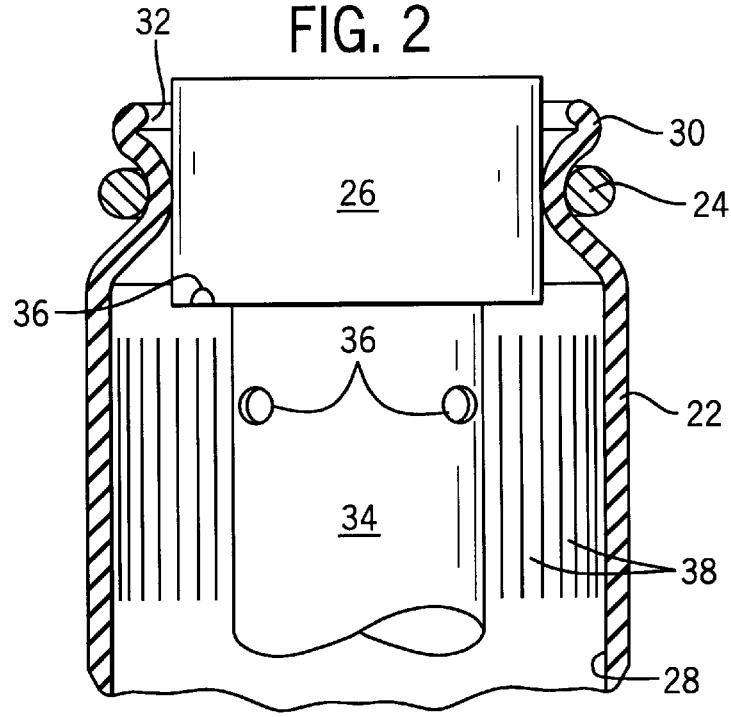
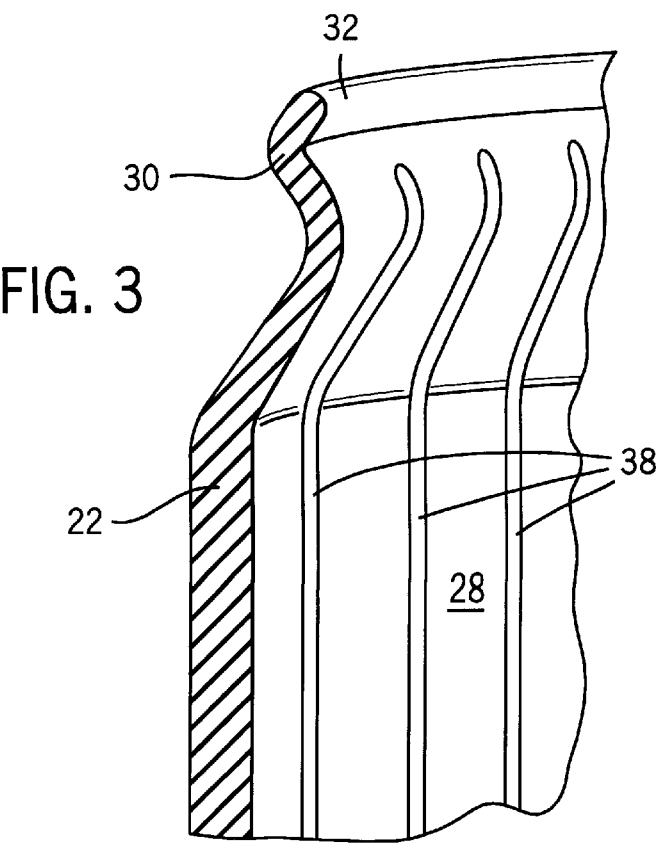

ELECTRIC SUBMERGIBLE MOTOR PROTECTOR HAVING COLLAPSE RESISTANT RIBBED ELASTOMERIC BAG

BACKGROUND OF THE INVENTION

1. Field of the Invention

The present invention relates to oil-filled protectors for use with electric motors and, more particularly, for use with electric submergible motors to be suspended within wellbores.

2. Description of Related Art

Electric submergible pumps are widely used throughout the world for recovering subterranean fluids to the earth's surface. For the long term successful operation of such submergible pumping systems, the electric motor must be supplied with uncontaminated cooling motor oil. This cooling oil is partially contained within one or more elastomeric bags within a motor protector.

Specifically, the elastomeric motor protector bags are generally cylindrical in shape and are sealed within an oil filled housing. The bags are filled with oil at the time of installation to an expanded state. With the rise of temperature caused by the immersion in the wellbore, as well as the thermal expansion caused by the operation of the electric motor, the bags tend to slightly expand even more. When the electric motor is turned off, the cooling oil cools and contracts. This contraction allows the motor protector bag to deflate. The repeated expanding and contraction of the elastomeric bag can cause splitting or cracks in the bag under certain conditions.

The cooling oil exits the bags for return to the electric motor through a series of openings or ports in a housing partially disposed within the bag. Under certain circumstances, the elastomeric bag can collapse when the cooling oil is exiting the bag, and contact and seal the ports. This blockage of the ports prevents the cooling oil from returning to the motor. Thus, the motor will operate at a higher than desired temperature, which can directly lead to shortened operational life, which in turn will cause the premature shutting-in of the well, and the costly removal and repair of the submergible pumping system.

There is a need for an improved elastomeric bag for use within an oil-filled electric motor protector that exhibits satisfactory elasticity, yet will not collapse against the oil return ports.

SUMMARY OF THE INVENTION

The present invention has been contemplated to overcome the foregoing deficiencies and meet the above described needs. Specifically, the present invention is a reinforced elastomeric bag for use within an electric submergible motor protector. The reinforced elastomeric bag has a generally cylindrical bag body formed as a single continuous structure, and a plurality of reinforcing ribs longitudinally disposed about an inside surface of the bag body. The reinforcing ribs prevent the bag body from collapsing onto and blocking oil inlet ports within the motor protector. Thereby protecting the motor from oil starvation, overheating, and resulting costly premature failure.

BRIEF DESCRIPTION OF THE DRAWINGS

FIGS. 2–5 are vertical partial cut-away views of alternate preferred embodiments of a reinforced elastomeric bag of the present invention.

DETAILED DESCRIPTION OF THE PREFERRED EMBODIMENTS

For the purposes of the following discussion it will be assumed that the elastomeric bag of the present invention is used within an oil-filled electric motor protector of the type used with submergible electric motors to be suspended within wellbores. However, it should be understood that the present invention can be used within any other type of downhole or surface motor, pump, turbine or other industrial machine that requires the use of an elastomeric body with improved tear resistance at temperatures greater than about 300 degrees F.

Figure 1:
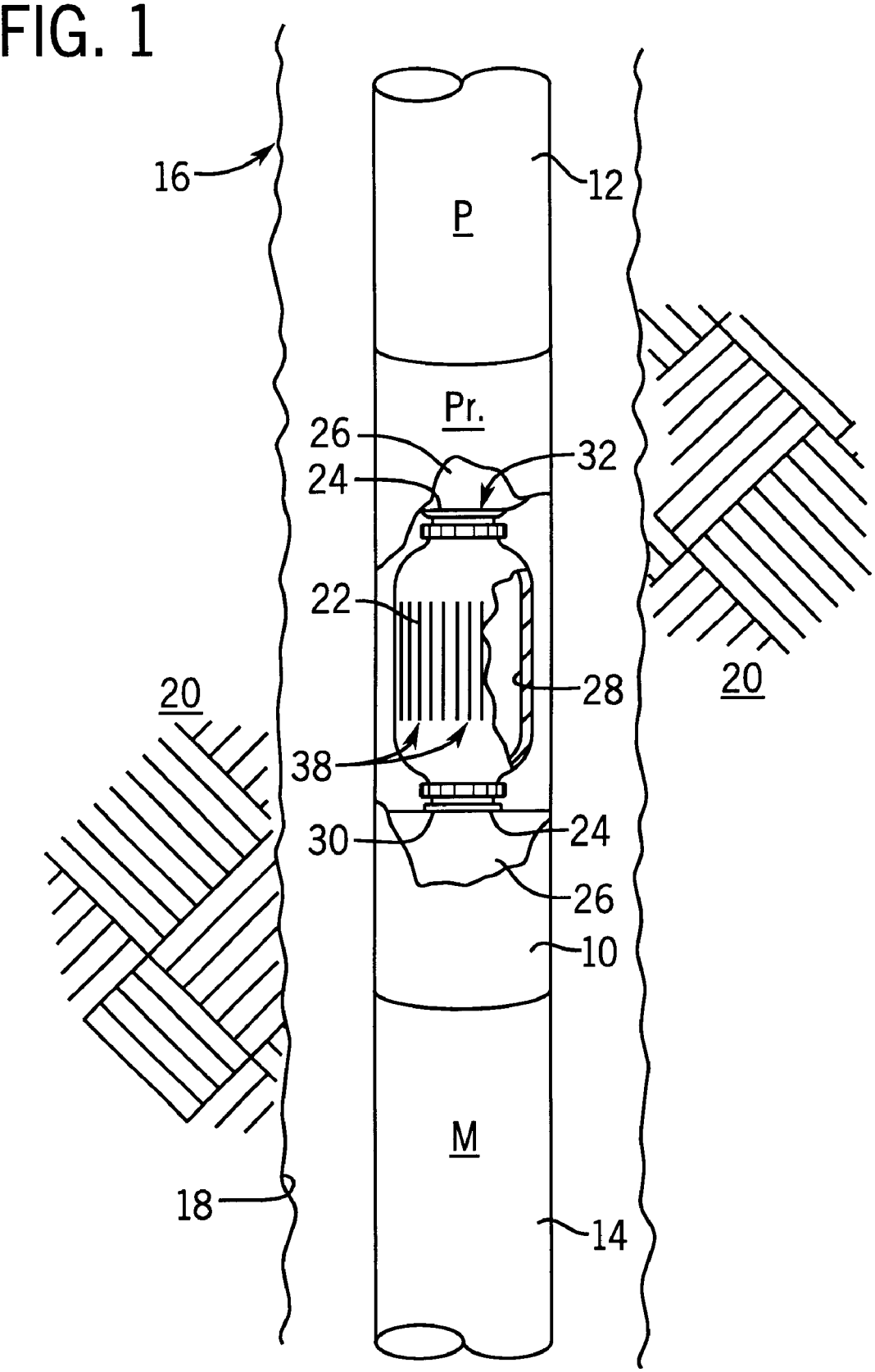
FIG. 1 is a vertical partial cut-away view of an oil-filled electric motor protector, shown operationally interconnected between a pump and an electric motor, and suspended within a subterranean wellbore.

As has been briefly described above the present invention is a reinforced elastomeric bag for use within an oil-filled electric motor protector. Electric motor protectors are well known to those skilled in the art, and they provide the capability for thermal expansion of the electric motor's cooling oil, they provide isolation of the cooling oil from wellbore fluids, and they usually contain thrust bearings to absorb the axial loading of the pump that is connected thereto. FIG. 1 illustrates one preferred embodiment of a motor protector 10 of the present invention connected, in any well known manner, between a pump 12 and an electric motor 14. The arrangement of the motor protector 10, the pump 12 and the electric motor 14 is commonly referred to as an electric submergible pumping system or "esp" 16. FIG. 1 shows the esp 16 suspended within a wellbore 18 that penetrates one or more earthen formations 20.

An interior of the motor protector 10 contains one or more generally cylindrical elastomeric bags 22, which are clamped on each end by annular brackets or rings 24 across spaced inner housings 26. An interior 28 of each bag 22 is filled with cooling oil that is conveyed to and from the electric motor 14 through internal passages (not shown) in the protector 10 and the motor 14, as is well known to those skilled in the art. The elastomeric bag 22 is preferably formed as a single continuous body, without a seam or weld, and has a thickened portion or bead 30 adjacent each mouth or end opening 32.

The bag body 22 is preferably formed primarily from an elastomeric material that provides desired elasticity at temperatures above about 300 degrees F. Suitable elastomeric materials include tetrafluoroethylene-propylene copolymers, vinylidene fluoride hexafluoropropylene copolymers, virtually saturated acrylonitrile-butadiene copolymers, vinylidene fluoride-perfluoromethylvinylether-tetrafluoroethylene terpolymers, vinylidene fluoride hexafluoropropylene tetrafluoroethylene terpolymers, ethylene propylene diene methylene-based polymers, and combinations thereof. One or more bonded layers of such material(s) can be used as is desired.

FIG. 2 illustrates the interior 28 of one preferred embodiment of a reinforced elastomeric bag 22 of the present invention. The housing 26 has a rotating shaft 34 extending there through to connect the motor 14 to the pump 12. On the housing 26 and/or in the shaft 34 are one or more openings or ports 36 from which the cooling oil can exit for return to the motor 14. In the past, under certain circumstances, a portion of the elastomeric bag adjacent the ports 36 would collapse upon and block the ports 36. If an elastomeric bag was used of greater thickness or of a stiffer material, then the elastomeric bag would not have the desired elasticity to properly expand and contract to regulate the internal pressures within the ESP 16. Therefore, the inventor hereof found that placing reinforcing ribs on the elastomeric bag 22 adjacent the ports 36 would prevent this collapsing of the bag.

As used herein, the term "reinforcing ribs" means one or more protrusions or structures that are applied to or formed into an interior surface and/or an exterior surface of the elastomeric bag 22 to prevent all or a portion thereof from collapsing, yet still retain the overall desired elasticity of the bag 22. These "reinforcing ribs" can have any desired cross-sectional shape, length, width, and thickness, as well as any desired spacing between ribs. The material that forms the ribs is preferably the same as the material that forms the bag 22; however, differing materials can be used as desired. The reinforcing ribs can be applied by coating the form mandrel, applying the elastomeric material, and then vulcanizing the bag 22. Alternately, the ribs can be applied after the vulcanization by hand and bonded or glued onto an internal and/or external surface of the bag 22.

Referring back to FIG. 1, a plurality of longitudinal ribs 38 are formed onto an exterior surface of the elastomeric bag 22. These ribs 38 can extend across the full longitudinal length of the bag 22, or can extend only across one or more sections of the bag 22, as is desired. Further, the ribs 38 are preferably circumferentially spaced around the entire exterior surface of the bag 22; however, the ribs 38 may only be located in certain desired areas circumferentially spaced about the exterior surface of the bag 22. In the embodiment shown in FIG. 1, the ribs 38 are formed or molded into the exterior surface of the bag 22; however, if desired, the ribs 38 can be formed from strips of elastomeric material that are bonded or glued onto the exterior surface of the bag 22.

In FIG. 2, the plurality of longitudinal ribs 38 are formed onto the interior surface of the elastomeric bag 22. These ribs 38 are in the form of relatively thin and closely spaced rectangular or trapezoidal ridges that extend across substantially the longitudinal length of the inside surface of the bag 22, or can extend only across one or more sections of the bag 22, as is desired. Further, the ribs 38 are preferably circumferentially spaced around the entire interior surface of the bag 22; however, the ribs 38 may only be located in certain desired areas circumferentially spaced about the interior surface of the bag 22. In the embodiment shown in FIG. 2, the ribs 38 are formed or molded into the interior surface of the bag 22; however, if desired, the ribs 38 can be formed from strips of elastomeric material that are bonded or glued onto the interior surface of the bag 22, as shown in FIG. 3.

Figure 4:
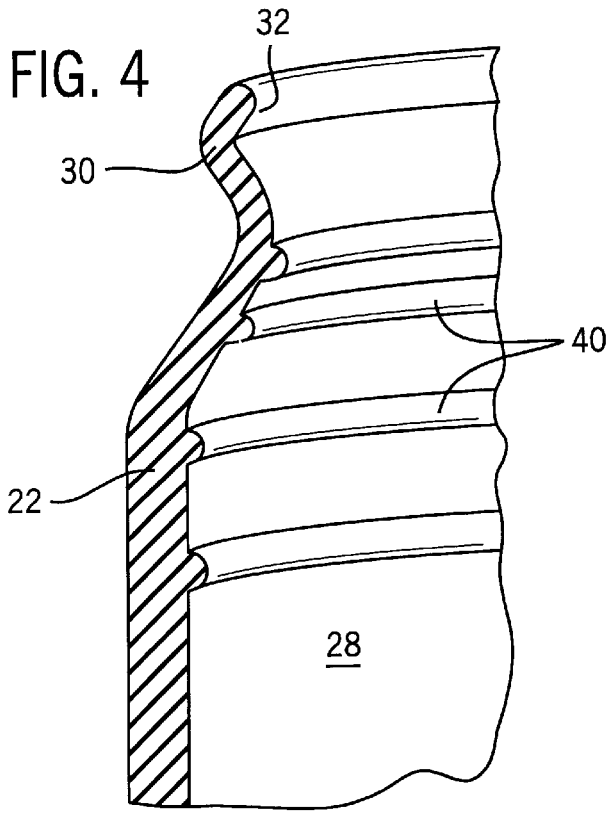

In FIG. 4, a plurality of circumferential ribs 40 are formed onto the interior surface of the elastomeric bag 22. These ribs 40 are in the form of rounded ridges that circumferentially extend around the bag 22, and are spaced across substantially the longitudinal length of the inside surface of the bag 22, or can extend only across one or more longitudinal sections of the bag 22, as is desired. In the embodiment shown in FIG. 4, the ribs 40 are formed or molded into the interior surface of the bag 22; however, if desired, the ribs 40 can also be formed into the exterior surface of the bag 22 or be formed from strips of elastomeric material that are bonded or glued onto the interior and/or exterior surfaces of the bag 22.

Figure 5:
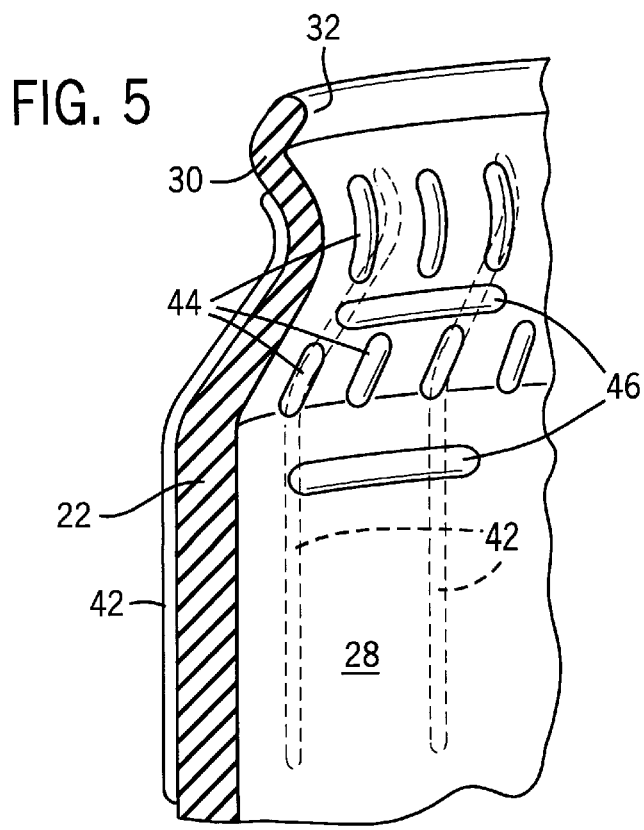

In FIG. 5, a plurality of longitudinal ribs 42 are formed onto the exterior surface of the elastomeric bag 22, and a plurality of relatively short ribs 44 are formed into the interior surface of the elastomeric bag 22. In addition, a plurality of relatively short circumferential ribs 46 in the form of rounded ridges are circumferentially spaced around the bag 22. The ribs 40, 42, 44, and 46 can be continuous, i.e., non-segmented, or can be segmented, as shown in FIG. 5.

As can be understood from the above discussions, the reinforced elastomeric bag of the present invention will resist collapsing so as not to contact and block the oil return ports in the protector. Thus, the motor will not be starved for oil that directly leads to shortened operational life, which in turn will cause the premature shutting-in of the well, and the costly removal and repair of the submergible pumping system.

Whereas the present invention has been described in particular relation to the drawings attached hereto, it should be understood that other and further modifications, apart from those shown or suggested herein, may be made within the scope and spirit of the present invention.

What is claimed is:

1. A motor protector for submergible electric motor system, the protector comprising:

a housing configured to be placed in fluid communication with a submergible motor;

a ported member in the housing for channeling cooling fluid to and from the electric motor; and a reinforced elastomeric bag positioned in the housing for storing the cooling fluid, the bag including a generally cylindrical bag body made from an elastomeric material, the bag body having a first thickness and an open end for receiving the fluid for cooling the electric motor, and a plurality of reinforcing ribs on the bag body at least in a region adjacent to the open end thereof, the reinforcing ribs having a second thickness greater than the first thickness and resisting collapse toward the ported member.

2. The motor protector of claim 1, wherein the bag body is formed as a single continuous structure.

3. The motor protector of claim 1, wherein the reinforcing ribs are formed integrally with the bag body.

4. The motor protector of claim 1, wherein the reinforcing ribs are bonded to the bag body.

5. The motor protector of claim 1, wherein the reinforcing ribs are formed on an inside surface of the bag body.

6. The motor protector of claim 1, wherein the reinforcing ribs include a plurality of longitudinally disposed ribs raised from an inside surface of the bag body.

7. The motor protector of claim 1, wherein the reinforcing ribs include a plurality of circumferentially disposed ribs raised from an inside surface of the bag body.

8. The motor protector of claim 1, wherein the reinforcing ribs extend from an outer surface of the bag body.

9. A motor protector for storing cooling fluid for an oil-filled submergible electric motor, the protector comprising:

a housing configured to be placed in fluid communication with a submergible motor, the housing including a port for channeling cooling fluid to and from the electric motor; and a reinforced elastomeric bag disposed in the housing and including a generally cylindrical bag body formed as a single continuous structure, the bag body having a first thickness, an open end for receiving motor cooling fluid via the port, a thickened bead around the open end, and a plurality of reinforcing ribs disposed about an inside surface of the bag body, the reinforcing ribs having a second thickness greater than the first thickness, whereby the reinforcing ribs resist collapse of the bag body in a direction towards the open end.

10. The motor protector of claim 9, wherein the ribs extend generally longitudinally toward the open end.

11. The motor protector of claim 9, wherein the ribs extend generally circumferentially around at least a portion of the inside surface.

12. The motor protector of claim 9, wherein the ribs are formed integrally with the bag body.

13. The motor protector of claim 9, wherein the ribs are bonded to the bag body.

14. A motor protector for storing cooling fluid for a submergible electric motor, the motor protector comprising:
   a housing configured to be placed in fluid communication with a submergible motor;
   a ported member in the housing for channeling cooling fluid to and from the electric motor; and
   an elastomeric bag disposed in the housing and at least partially around the ported member for storing cooling fluid for the electric motor, the bag including a unitary elastomeric body having a first thickness and a plurality of ribs secured to the body, the ribs having a second thickness greater than the first thickness, whereby the ribs resist collapse of the elastomeric body inwardly towards the ported member.

15. The motor protector of claim 14, wherein the reinforcing ribs extend longitudinally on the elastomeric body adjacent to an end thereof.

16. The motor protector of claim 15, including additional reinforcing ribs extending annularly around the elastomeric body.

17. The motor protector of claim 14, wherein the elastomeric body is secured to the ported member via an annular clamp, the ported member extends at least partially into the elastomeric body, and the reinforcing ribs extend in a region adjacent to the ported member.

18. The motor protector of claim 14, wherein the reinforcing ribs extend annularly around the elastomeric body in region adjacent to the ported member.

19. The motor protector of claim 14, wherein the reinforcing ribs are formed of the same material as the elastomeric body.

20. The motor protector of claim 14, wherein the reinforcing ribs are bonded to the elastomeric body after formation of the body.

* * * * *